No. 664,666. Patented Dec. 25, 1900.
J. J. McNULTY.
CART.
(Application filed Aug. 30, 1900.)
(No Model.) 2 Sheets—Sheet 1.

WITNESSES:

INVENTOR
John J. McNulty.
BY
ATTORNEYS

No. 664,666. Patented Dec. 25, 1900.
J. J. McNULTY.
CART.
(Application filed Aug. 30, 1900.)
(No Model.) 2 Sheets—Sheet 2.
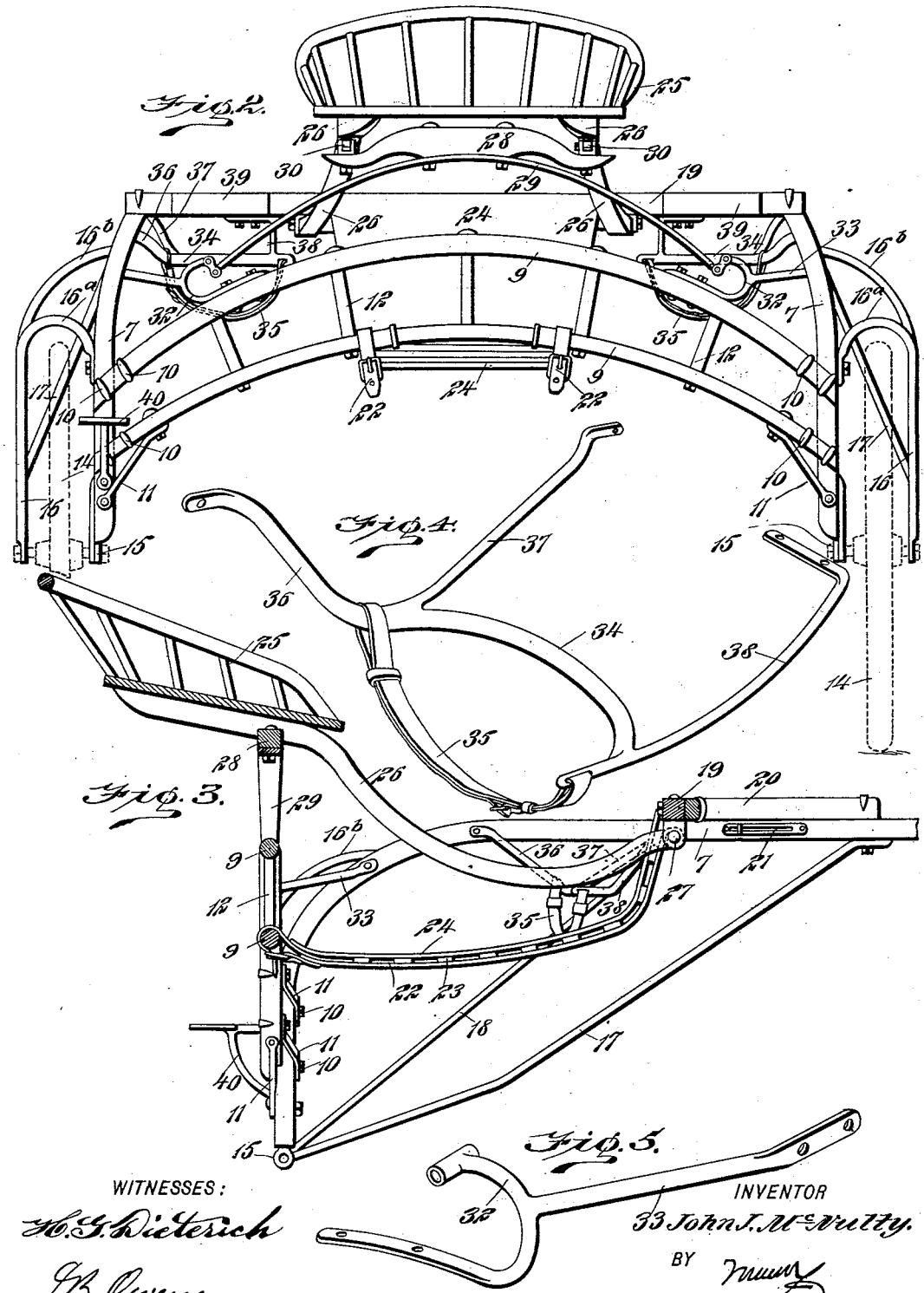

UNITED STATES PATENT OFFICE.

JOHN JOSEPH McNULTY, OF CARMEL, NEW YORK.

CART.

SPECIFICATION forming part of Letters Patent No. 664,666, dated December 25, 1900.

Application filed August 30, 1900. Serial No. 28,593. (No model.)

*To all whom it may concern:*

Be it known that I, JOHN JOSEPH McNULTY, a citizen of the United States, and a resident of Carmel, in the county of Putnam and State of New York, have invented a new and Improved Cart, of which the following is a full, clear, and exact description.

This invention relates to that class of light carts which are generally known as "jogging-carts," these carts being used for the exercise of horses rather than for the actual racing thereof, the object being to give the driver some degree of comfort, which cannot be had in sulkies and other vehicles of that class, and at the same time to provide a cart which is light and strong in construction and which will be adapted to the movements of the horse, so as not to interfere in any way with his freedom of exercise.

This specification is the disclosure of one form of the invention, while the claims define the actual scope thereof.

Reference is to be had to the accompanying drawings, forming a part of this specification, in which similar characters of reference indicate corresponding parts in all the views.

Figure 1:
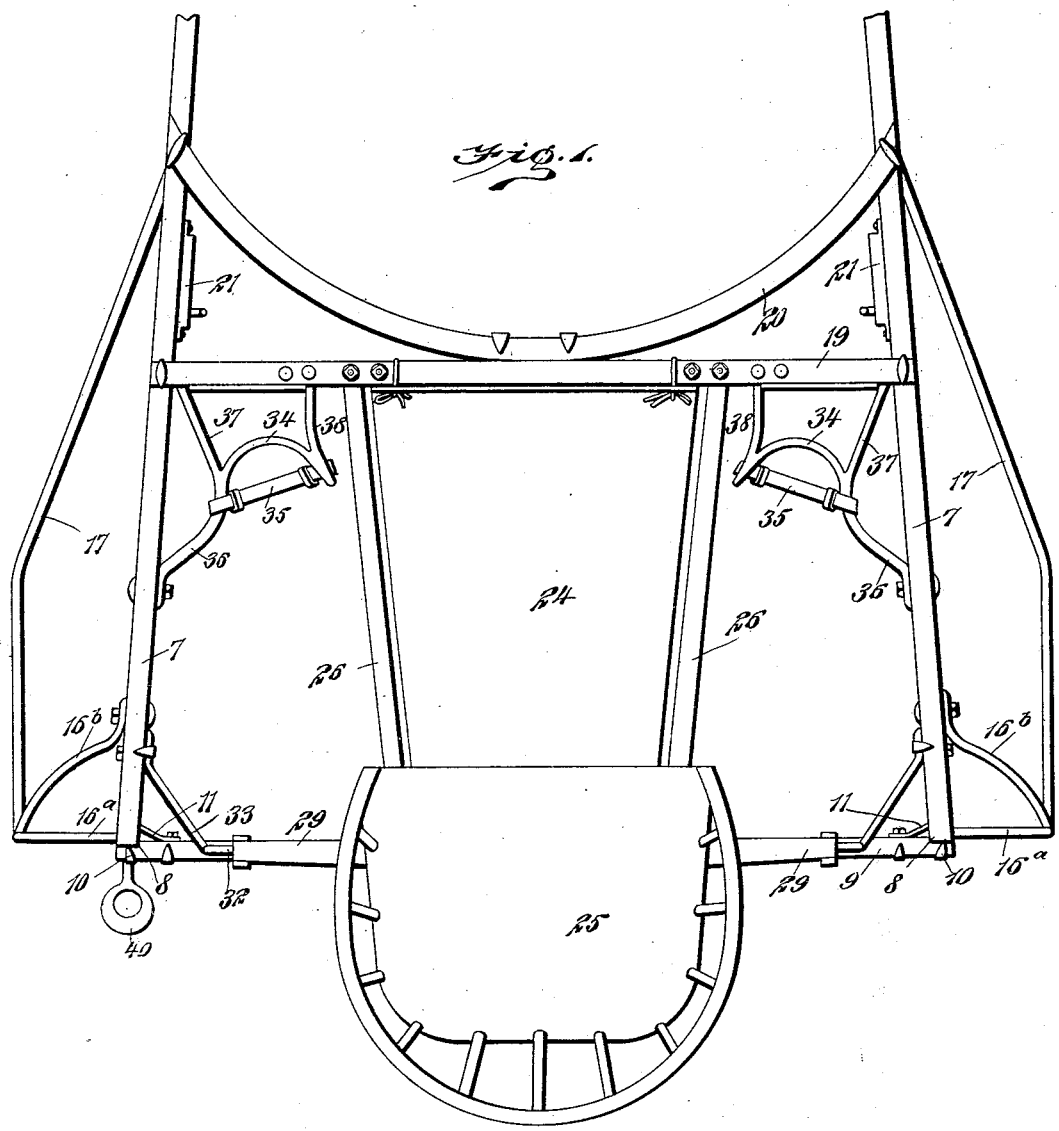
Figure 6:
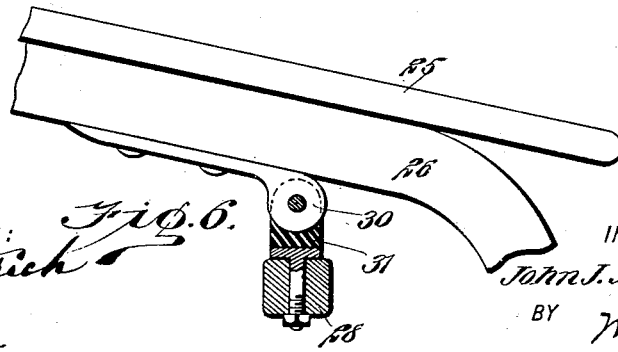

Figure 1 is a plan view of the invention. Fig. 2 is a rear elevation thereof. Fig. 3 is a longitudinal section. Fig. 4 is a detail perspective view of the foot-rest. Fig. 5 is a detail view of one of the brackets which carries the spring, and Fig. 6 is a detail section showing the manner of mounting the seat on the spring-bar.

The thills 7 are curved downward and rearward, their rear extremities running truly vertical, and bearing against the vertical portions of the thills 7 are shoulders 8, formed on the ends of the arch-bars 9. These shoulders 8 are produced by notches formed in the ends of the arch-bars, and the arch-bars are fastened rigidly to the thills by bolts 10 and brace-plates 11, the latter being best seen in Figs. 1 and 3. The thills therefore form abutments receiving the end thrust of the arch-bars 9. The arch-bars 9 are connected rigidly by cross-bars 12, which parts 9 and 12 form a secure framing, serving as the main or body member of the organism of parts composing the cart. The bars 9 are high-arched above the ground, so as to permit the horse to throw high his hind hoofs in running, or, in other words, so as to permit free hock action of the horse. The wheels 14 are carried on short axles journaled at their inner ends in plates 15, carried by the thills 7, and at their outer ends in a bracket 16, each of which has two branches 16$^a$ and 16$^b$, which extend upward and inward over the wheels and are fastened to the thills. The brackets 16 are braced by rods 17, which are fastened to the thills and pass rearward and downward outside of the wheels and are attached to the lower ends of the brackets 16, and the thills are braced at their curved portions (see Fig. 3) by rods 18, passing from the lower rear ends of the thills upward and forward to the straight portions thereof and situated directly beneath the thills, which location accounts for these rods 18 not being visible in Figs. 1 and 2 of the drawings.

Forward of the arch or frame bars 9 the thills are provided with a rigidly-fastened cross-bar 19 and brace 20, and tug devices 21 are attached to the thills just rearward of the brace 20, whereby to connect the traces with the thills. Fastened to the cross-bar 19 and to the bottom bar 9 of the arch-frame are two straps 22, of iron or leather or a composition of both. These straps run parallel and carry slats 23, which support a fabric 24, forming a sort of bottom for the cart. This bottom is freely suspended and is therefore movable; but at the same time it furnishes a secure footing for the rider when mounting the cart or dismounting therefrom.

The seat 25 is fastened rigidly to two seat-bars 26, which extend forwardly and are curved downward, as best shown in Fig. 3, the front ends of the seat-bars 26 being pivotally connected through the medium of hinges 27 with the under side of the cross-bar 19. The seat and seat-bars being rigidly connected and the seat-bar being pivoted to the cross-bar 19, the seat is thus mounted to move freely up and down. The seat is sustained in its proper position by means of a spring-bar 28, mounted on a semicylindrical spring 29. The ends of the spring-bar 28 are dropped or curved downward, as best shown in Fig. 2, and these end portions are hingedly connected with the seat-bars 26 through the medium of hinges 30, which may be of any desired construction, but which are preferably constructed as shown in Fig. 6. A leather block 31 is interposed between the parts of the hinge 30, so as to prevent rattling of these parts during the movement of the vehicle. The ends of the spring 29 are mounted in brackets 32, which are fastened to the top arch-bar 9 and which are furnished with outwardly and forwardly projecting brace-arms 33, fastened to the thills at points forward of the arch-frame. In order to insure the comfort of the rider of the cart, the seat must be placed as low as possible. At the same time it is necessary to place the arch-frame high above the ground, so as not to interfere with the free movement of the heels of the horse, which movement is usually known as the "hock action" of a horse. By means of the peculiarly-arranged supporting-bar 28 I am enabled to lower the seat to the necessary extent, and it does not become necessary for me to lower the arch-frame. This advantage is due to the spring-bar fastened to the top of the spring 29 and having its ends dropped downward, so that the middle portion of the spring-bar comes directly beneath and in close proximity to the bottom of the seat itself. A further advantage of this seat construction is that the seat-bars 26, with their hinged connections at the points 27 and 30, give the seat great ease of movement, and the motion of the horse, which ordinarily is communicated directly to the seat in this class of vehicles, is lost before reaching the seat. This is due to the fact that the seat-bars swing up and down around the hinges 27, and the hinged connections 30 permit the spring 29 to swerve slightly forward and backward as the seat moves up and down around the centers of the hinges 27.

I provide foot-rests for the cart, which are arranged just rearward of the cross-bar 19 and respectively at the inner sides of the thills. These foot-rests (one of which is shown in detail in Fig. 4) each comprises a bar 34, against which the feet are pressed. The ends of the bar 34 carry a strap 35, on which the heel of the driver rests and by which the entire foot and leg are supported. The straps 35 serve, therefore, to support the legs of the driver without making exertion on the driver's part necessary, and the bars 34 serve to receive the pressure which the driver must apply in holding back on the reins of the horse. The bar 34, with its strap 35, is held rigidly in place by three arms, (respectively designated 36, 37, and 38.) The arms 36 and 37 are attached to one end of the bar 34 and project oppositely, their outer ends being fastened to the thills, as indicated best in Fig. 1, and the arm 38 is fastened to the opposite end of the bar 34 and projects forwardly and upwardly and is fastened to the under side of the cross-bar 19. The rear face of the cross-bar is provided adjacent to the foot-rest with leather or other pads 39, which are in position to be engaged by the toes of the driver, so that, if desired, the pressure of the driver's foot may be divided between the bars 34 and 39, and, indeed, should the driver desire to use great force on the reins he may lift his feet out of the foot-supports and place them on the pads 39, in which case he will be able to pull stronger on the reins. In connection with these seat-supports it will be seen that they comprise drop-frames that fasten to the rigid parts of the cart and which enable the driver to rest his feet below these parts. The structure of the foot-rests holds the feet securely and does not necessitate any action whatever on the part of the driver to keep his feet in place. A step 40 is provided for the rear side of one of the thills to facilitate mounting the cart.

By the construction above described I derive every possible advantage which is sought in this class of vehicles, and at the same time I produce a cart which is light and strong. So light is this construction that I have been able in experimenting with my invention to produce a complete cart capable of enduring all of the strains to which it in operation must be subjected the weight of which does not exceed seventy-five pounds.

Having thus described my invention, I claim as new and desire to secure by Letters Patent—

1. A cart, having thills, an arch-frame extending between the rear ends of the thills and joined thereto, a cross-bar attached to and extending between the thills forward of the arch-frame, a spring mounted on the arch-frame, a seat-bar hinged to the cross-bar of the thills and extending over the spring, a hinge forming a connection between the spring and the seat-bar, and a seat carried by the seat-bar.

2. A cart, having thills, a cross-bar extending between the thills, a frame extending between the thills rearward of the cross-bar, a seat-bar hinged to the cross-bar, a spring mounted on the frame and having hinged connection with the seat-bar, and a seat carried rigidly by the seat-bar at a point over the spring.

3. A cart, having thills, an arch-frame extended between the ends of the thills, a spring mounted on the arch-frame, a spring-bar attached to the spring and having its end portions dropped or bent downward, seat-bars mounted on the ends of the spring-bar, and a seat carried by the spring-bar.

4. A cart, having a bar forming a foot-rest, and a stirrup-strap hanging downward therefrom to sustain the foot in engagement with the bar.

5. A cart having a foot-rest, and a stirrup-strap hanging downward therefrom to sustain the foot in engagement with the foot-rest.

In testimony whereof I have signed my name to this specification in the presence of two subscribing witnesses.

JOHN JOSEPH McNULTY.

Witnesses:
HOBART W. HAZEN,
EDWARD C. WEEKS.